United States Patent [19]

Davis et al.

[11] 4,135,863

[45] Jan. 23, 1979

[54] IMPELLER FOR A MAGNETICALLY COUPLED PUMP

[75] Inventors: Lee W. Davis; James S. Hollingsworth, both of Oklahoma City; Leo L. Roberts, Moore, all of Okla.

[73] Assignee: Little Giant Corporation, Oklahoma City, Okla.

[21] Appl. No.: 838,317

[22] Filed: Sep. 30, 1977

[51] Int. Cl.² ............ F04B 35/04; F16D 27/01
[52] U.S. Cl. .................................................. 417/420
[58] Field of Search ............... 417/420; 310/104, 103; 64/28 M

[56] References Cited

U.S. PATENT DOCUMENTS

| | | | |
|---|---|---|---|
| 2,783,401 | 2/1957 | Foster et al. | 310/104 |
| 3,299,819 | 1/1967 | McCoy | 417/420 |
| 3,490,379 | 1/1970 | Laing | 417/420 |
| 3,938,914 | 2/1976 | Zimmermann | 417/420 |

Primary Examiner—Carlton R. Croyle
Assistant Examiner—Leonard E. Smith
Attorney, Agent, or Firm—Dunlap, Codding & McCarthy

[57] ABSTRACT

An improved impeller for a pump of the type wherein the impeller is sealed within a pump housing and driven by a rotating external drive magnet magnetically coupled to an impeller magnet forming a portion of the impeller.

10 Claims, 3 Drawing Figures

IMPELLER FOR A MAGNETICALLY COUPLED PUMP

BACKGROUND OF THE INVENTION

1. Field of the Invention

This invention relates generally to improvements in magnetically coupled pumps and, more particularly, but not by way of limitations, to improvements in the construction of impellers for such pumps.

2. Description of the Prior Art

Magnetically coupled pumps; that is, pumps having an impeller rotatably mounted within a sealed pump housing and coupled magnetically to an external drive magnetic which is rotated to rotate the impeller, are advantageously used in many pumping applications. For example, the pump may be used to circulate a fluid which is corrosive so that stringent chemical requirements are placed on the materials of which the pump is constructed. If the impeller of the pump is driven by a shaft which passes through a seal in the pump housing, the seal must, in general, meet the same chemical requirements. Since the seal must also have physical properties dictated by its primary function of permitting the shaft to rotate while preventing the escape of fluid from the pump, it can be difficult to find suitable materials for constructing seals. This problem is avoided in magnetically coupled pumps by eliminating the need for such seals.

Problems can also be encountered in magnetically coupled pumps. In many applications, the impellers of such pumps are often subjected to temperature variations in the fluid being pumped. Since the impeller must contain a magnet for coupling to the external drive magnet, differences between the thermal expansion properties of the impeller magnet and other portions of the impeller can result in repeated stressing of the impeller and such repeated stressing can shorten the lifetime of the pump. Moreover, materials which have suitable magnetic properties for construction of the impeller magnet may not have desirable chemical properties with regard to the fluid passing through the pump in a particular application.

These problems can be especially acute when the impeller magnet is formed of a ceramic material. Such materials tend to brittle and they crack when exposed to thermal shock. If the magnet cracks, portions of the magnet may engage the pump housing and jam the pump. One solution to this latter problem is to provide the magnet with a guard member such as that described in U.S. Pat. No. 3,938,914, issued Feb. 17, 1976 to Zimmerman.

It is known that magnets may be formed of magnetic particles imbedded in a plastic matrix. The construction of such magnets has been described in U.S. Pat. No. 3,881,853, issued May 6, 1975 to Loubier.

SUMMARY OF THE INVENTION

The present invention contemplates an impeller for a magnetically coupled pump in which the impeller magnet is slidably mounted on an impeller hub such that the impeller magnet may move longitudinally along the hub. Stops on the hub limit this movement without clamping the magnet to the hub so that variations in the dimensions of the hub and of the magnet, arising from thermal variations in the fluid being pumped, will not result in mechanical stressing of the impeller. A key meshing with a slot in the magnet prevents relative rotation between the hub and the impeller magnet.

The magnet is formed of magnetic particles suspended in an organic plastic matrix so that the magnet is relatively immune to the effects of thermal shock resulting from rapid variations in the temperature of the fluid being pumped. Moreover, since the magnet is placed on the hub as a separate entity from other portions of the impeller, the incorporation of the magnet into the impeller places no chemical requirements on the plastic in which the magnetic particles are suspended. Accordingly the plastic may be chosen on the basis of the chemical properties of the fluid being pumped in a specific application.

An object of the invention is to provide a mechanically coupled pump combining simplicity of construction with a high degree of tolerance for variations in the temperature of the fluid being pumped.

Another object of the invention is to provide a mechanically coupled pump which is chemically inert with regard to fluids pumped thereby while maintaining a simplicity of structure for the pump.

Other objects and advantages of the invention will be evident from the following detailed description when read in conjunction with the accompanying drawings which illustrate a preferred embodiment of the invention.

DESCRIPTION OF THE PREFERRED EMBODIMENT

Figure 1:
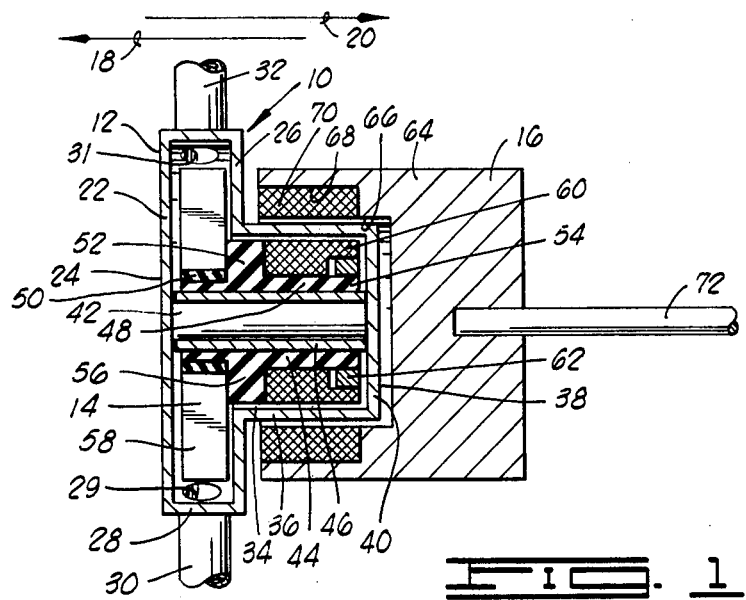
FIG. 1 is a side elevational view in cross section of a pump constructed in accordance with the present invention.

Referring now to the drawings and to FIG. 1 in particular, shown therein and designated by the general reference numeral 10 is a magnetically coupled pump constructed in accordance with the present invention. The pump 10 comprises a pump housing 12, an impeller 14 disposed within the pump housing 12, and a drive assembly 16 disposed externally of the pump housing 12. In order to simplify the discussion of the pump 10, a forward direction 18 and a rearward direction 20 have been indicated on the diagrams. Accordingly, relative positions of components of the pump 10 will be described herein by indicating that specified components are disposed rearwardly or forwardly of other specified components. It will be clear from the description below that no limitation on the positioning of the pump 10 is imposed by such manner of describing relative positions.

The pump housing 12 includes a forward section 22 shaped generally in the form of a disk. The forward section 22 comprises a forward bulkhead 24 a rear bulkhead 26 and a circular wall 28 connecting the forward bulkhead 24 and the rear bulkhead 26. The wall 28 is provided with apertures 29 and 31 and an inlet tube 30 and an outlet tube 32 extend substantially tangentially from the wall 28, the inlet tube 30 communicating with the interior of the forward section 22 via the aperture 29 and the outlet tube 32 communicating with the interior of the forward section 22 via the aperture 31.

An impeller magnet chamber 34 is formed in the rear bulkhead 26 of the forward section 22 of the pump housing 12 and extends rearwardly from the forward section 22. The impeller magnet chamber 34 has a cylindrical wall 36 and the axis of the wall 36 coincides with the axis of the wall 28 of the forward section 22. The impeller magnet chamber 34 is in fluid communication with interior of forward section 22 and is closed at a rear end 38 of the pump housing 12 by an impeller magnet chamber bulkhead 40 such that, with the exception of the inlet tube 30 and the outlet tube 32, the pump housing 12 is sealed. A circular shaft 42 is connected between the forward bulkhead 24 of the forward section 22 and the impeller magnet chamber bulkhead 40 and the shaft 42 extends along the common axis of the forward section 22 and the impeller magnet chamber 34 of the pump housing 12.

The impeller 14 comprises a hub 44 mounted on the shaft 42 and extending substantially the length of the shaft 42. The hub 44 includes a bushing 46, slidably engaging the shaft 42, and a sleeve 48 disposed about the bushing 46. The hub 44 has a forward portion 50, a central portion 52 and a rear portion 54. A flange 56 is formed on the central portion 52 of the hub 44 and extends radially therefrom terminating near the wall 36 of the impeller magnet chamber 34. A vane assembly 58 is mounted on the forward portion 50 of the hub 44 and, as will be described more fully below, may be rotated to draw fluid from the inlet tube 30 and exhaust the fluid via the outlet tube 32. Rearwardly of the flange 56, a magnet 60 is slidably mounted on the hub 44 and a ring 62 is secured to the rear portion 54 of the hub 44. The flange 56 forms a forward stop for the magnet 60 and the ring 62 forms a rear stop for the magnet 60 so that the flange 56 and the ring 62 cooperate to longitudinally position the magnet 60 on the hub 44. As will be described more fully below, the magnet 60 is circularly positioned on the hub 44 in a manner to prevent relative rotation between the magnet 60 and the hub 44.

The drive assembly 16 comprises a cylindrical drive block 64 having a circular bore 66 formed therein. The drive block 64 is positioned with respect to the pump housing 12 such that the impeller magnet chamber 34 is disposed within the bore 66. A forward portion 68 of the bore 66 is enlarged and a toroidal drive magnet 70 is secured with the enlarged forward portion 68 of the bore 66. The drive block 64 is supported by a shaft 72 and may be rotated to turn the toroidal drive magnet 70 about the impeller magnet chamber 43 by means of an electric motor (not shown) connected to the shaft 72.

Figure 2:
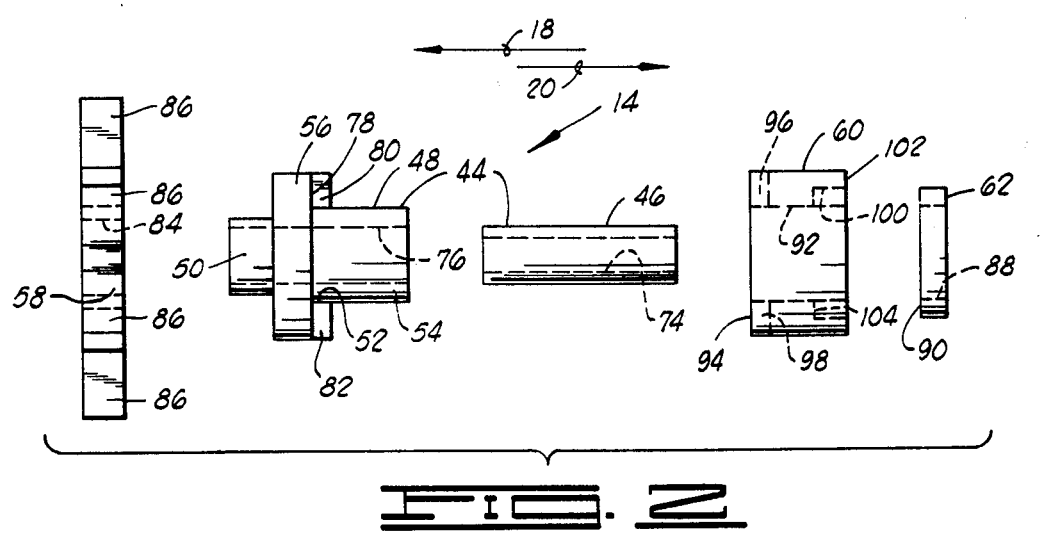
FIG. 2 is an exploded view of the impeller of the present invention in side elevation.

Referring now to FIG. 2, shown therein is an exploded view of the impeller 14. As shown in FIG. 2, the bushing 46 is a cylindrical tube having a bore 74 sized to permit the bushing 46 to be placed on the shaft 42. The sleeve 48 of the hub 44 is also cylindrical and has a bore 76 sized to permit the sleeve 48 to be placed in the bushing 46.

In the preferred embodiment of the present invention the flange 56 is formed unitarily with the sleeve 48. A magnet stop face 78, facing toward the rear portion 54 of the hub 44, is formed on the flange 56. Keys 80 and 82 are unitarily formed on the magnet stop face 78 of the flange 56 for a purpose which will be described hereinbelow.

The vane assembly is provided with a circular bore 84 sized to permit the vane assembly 58 to be placed on the forward portion 50 of the hub 44 as shown in FIGS. 1 and 2. The vane assembly 58 is secured on the forward portion 50 of the hub 44 by any suitable means, such as, for example, via an adhesive. Alternatively, the vane assembly 58 may be formed unitarily with the sleeve 48. The vane assembly 58 comprises a plurality of vanes 86 extending radially away from the forward portion 50 of the hub 44 to drive fluid through the pump 10 when the vane assembly 58 is rotated.

The ring 62 has a bore 88 sized to permit the ring 62 to be placed on the sleeve 48 of the hub 44. A magnet stop face 90 is formed on the ring 62 and the ring 62 is positioned on the hub 44 such that, when the impeller 14 is assembled in FIG. 1, the magnet stop face 90 on the ring 62 faces the magnet stop face 78 on the flange 56.

The impeller magnet 60 is provided with a bore 92 to permit the impeller magnet 60 to be place on the rear portion 54 of the hub 44. The bore 92 of the impeller magnet 60 is slightly larger than the hub 44 such that the impeller magnet 60 is free to slide on the hub 44. The impeller magnet 60 has a forward face 94 which is positioned adjacent the magnet stop face 78 of the flange 56 when the impeller 14 is assembled as illustrated in FIG. 1. Slots 96 and 98 are formed in the forward face 94 of the impeller magnet 60 and the slots 96 and 98 mesh with the keys 80 and 82 on the magnet stop face 78 of the flange 56 to circularly position the impeller magnet 60 on the hub 44. The bore 92 has an enlarged portion 100 intersecting the rear end 102 of the impeller magnet 60 and, when the impeller 14 is assembled as illustrated in FIG. 1, the ring 62 is disposed within the enlarged portion 100 of the bore 92. The enlarged portion 100 of the bore 92 terminates in a shoulder such that the impeller magnet 60 is provided with a rear face 104 positioned adjacent the ring 62 in the assembled impeller 14.

The separation of the forward face 94 and the rear face 104 of the impeller magnet 60 is slightly smaller than the separation between the magnet stop faces 78 and 90 of the flange 56 and the ring 62 respectively to permit thermal expansion of the impeller magnet 60 without developing stresses within the impeller 14. Thus, the flange 56 and the ring 62 cooperate to limit the forward disposition and the rearward disposition respectively of the impeller magnet 60 without clamping the impeller magnet 60 between the flange 56 and the ring 62.

The impeller magnet 60 is substantially cylindrically symmetric with respect to the axis of the bore 92. As used herein the term substantially cylindrically symmetric means the symmetry is broken only to the extent that means are provided to circularly position the magnet 60 on the hub 44. In the preferred embodiment of the present invention the cylindrical symmetry of the impeller magnet 60 is broken only in the provision of the slots 96 and 98 in the forward face of the impeller magnet 60.

Figure 3:
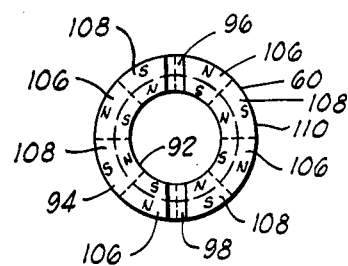
FIG. 3 is an end view of the magnet of the impeller illustrating the manner in which the magnet is magnetized.

The impeller magnet 60 is constructed of a composite material formed by imbedding magnetized particulate matter within an organic plastic matrix. In the preferred embodiment of the present invention, the magnetic particles are polarized to circularly divide the impeller magnet 60 into four first magnetic regions 106 and four second magnetic regions 108, each second magnetic region 108 being disposed between two of the first magnetic regions 106 as illustrated in FIG. 3. The magnetic regions 106 and 108 are substantially equal in angular extent and each of the magnetic regions 106 and 108 subtends an angle of substantially 45° about the axis of the bore 92. In the first magnetic regions 106, the magnetic particles are aligned such that the first magnetic regions are magnetically polarized in a radially outward direction from the axis of the bore 92 of the impeller magnet 60; that is, portions of the outer peripheral surface 110 of the impeller magnet 60 corresponding to a first magnetic region 106 from north magnetic poles. In the second magnetic regions, the magnetic particles are aligned such that the second magnetic regions 108 are polarized in a radially inward direction with respect to the axis of the bore 92 of the impeller magnet 60. The torodial drive magnet 70 is similarly circularly divided into four first magnetic regions (not shown), wherein the magnetic polarization is directed radially outwardly from the impeller magnet chamber 34, and into four second magnetic regions (not shown), wherein the magnetic polarization is directed radially inwardly toward the impeller magnet chamber 34.

OPERATION OF THE PREFERRED EMBODIMENT

Although the operation of the magnetically coupled pump 10 incorporating the improved impeller 14 of the present invention will be clear from the above description of the construction of the pump 10, a brief description of this operation will now be presented in order to illustrate a manner in which the impeller 14 contributes to the operation of the pump 10. The magnetic interaction between the impeller magnet 60 and the drive magnet 70 is such to cause each first magnetic region 106 of the impeller magnet 60 to align with a first magnetic region (not shown) of the drive magnet 70. Thus, the impeller magnet 60 may be subjected to a torque tending to rotate the impeller magnet 60 about the shaft 42 of the pump housing 12 by rotating the drive block 64 in which the drive magnet 70 is disposed. The rotation of the drive block 64 is provided by an electric motor (not shown) attached to the shaft 72. Since the keys 80 and 82 on the magnet stop face 78 of the flange 68 mesh with the slots 96 and 98 on the forward face 94 of the impeller magnet 60 to circularly position the impeller magnet 60 on the hub 44 of the impeller 14, a rotation of the drive block 64 will cause the impeller 14 to rotate about the shaft 42 of the pump housing 12. As the impeller 14 rotates, the vanes 86 of the vane assembly 58 drive a fluid within the pump housing 12 from the inlet tube 30 to the outlet tube 32 to pump the fluid through the pump 10.

Should the temperature of the fluid passing through the pump 10 vary, thermal expansion effects will cause corresponding variations in the dimensions of the components of the impeller 14. In general, the variation in the dimensions of the impeller magnet will differ from that of other portions of the impeller 14 such that the relative dimensions of the impeller magnet 60 and the other portions of the impeller 14 will vary. Since the impeller magnet 60 is positioned on the hub 44 of the impeller 14, but not secured thereto, the disparity in the relative variation in the dimensions of the impeller magnet 60 and other portions of the impeller 14 will produce no mechanical stress within the impeller 14.

The construction of the impeller 14 in accordance with the present invention will also provide protection against thermal shock induced by a rapid variation in the temperature of the fluid being circulated by the pump 10. Since the impeller magnet 60 is constructed of magnetized particulate matter imbedded in a plastic matrix, thermal shock will cause the plastic matrix material to flow rather than to fracture. Moreover, the above described construction of the impeller magnet 60 permits the pump 10 to be used with corrosive fluids capable of attacking the material forming the substance of the magnetic particles. Since the particles are imbedded within a plastic matrix, and thereby coated with plastic matrix material, the plastic matrix protects the particles from chemical attack by the fluid. Thus, means to eliminate corrosion of the impeller magnet 60 are eliminated.

It will be clear that the present invention provides for simplicity in the construction of a magnetically coupled pump while eliminating corrosion and thermal stress problems which have previously been encountered in such pumps. Changes may be made in the construction and the arrangement of the parts as disclosed herein without departing from the spirit and scope of the invention as defined in the following claims.

What is claimed is:

1. An improved impeller for a magnetically coupled pump of the type wherein the impeller is rotatably supported on a shaft disposed within a pump housing and wherein rotation is imparted to the impeller by a rotating drive magnet disposed externally to the pump housing and magnetically coupled to the impeller, the improved impeller comprising:

a hub mounted on the shaft for rotation thereabout;

a vane assembly mounted on a forward portion of the hub, the vane assembly having a plurality of vanes extending radially with respect to the shaft for pumping fluid through the pump housing in response to the rotation of the hub;

an impeller magnet slidably mounted on a rear portion of the hub for coupling with the drive magnet;

forward stop means supported by the hub for limiting the forward disposition of the impeller magnet on the hub;

rear stop means supported by the hub for limiting the rear disposition of the impeller magnet on the hub; and angular positioning means supported by the hub for circularly positioning the impeller magnet on the hub whereby rotation of the impeller magnet via the magnetic coupling between the impeller magnet and the rotating drive magnet rotates the impeller.

2. The improved impeller of claim 1 wherein the impeller magnet is characterized as being constructed of particulate magnetic material imbedded in an organic plastic matrix.

3. The improved impeller of claim 2 wherein the impeller magnet is characterized as being substantially cylindrically symmetric with respect to the shaft, wherein the impeller magnet is further characterized as having a plurality of first magnetic regions magnetically polarized in a radially outward direction with respect to the shaft and a plurality of second magnetic regions magnetically polarized in a radially inward direction with respect to the shaft, wherein the number of first magnet regions is equal to the number of second magnet regions, and wherein each first magnet region is circularly disposed between two second magnet regions and each second magnet region is circularly disposed between two first magnet regions.

4. The improved impeller of claim 3 wherein the number of first magnet regions is four and the number of second magnet regions is four.

5. The improved impeller of claim 1 wherein the impeller magnet has a forward face for engaging the forward stop means and wherein the forward stop means is a flange formed on the hub forwardly of the impeller magnet, the flange having a magnet stop face adjacent the impeller magnet.

6. The improved impeller of claim 5 wherein at least one slot is formed in the forward face of the impeller magnet and the angular positioning means comprises at least one key formed on the magnet stop face of the flange, the key meshing with the slot formed in the forward face of the impeller magnet to circularly position the impeller magnet on the hub.

7. The improved impeller of claim 6 wherein the impeller magnet has a rear face for engaging the rear stop means and the rear stop means is a ring secured on the hub rearwardly of the rear face of the impeller magnet.

8. The improved impeller of claim 7 wherein the impeller magnet is characterized as being constructed of particulate material imbedded in an organic plastic matrix.

9. The improved impeller of claim 8 wherein the impeller magnet is characterized as being substantially cylindrically symmetric with respect of the shaft, wherein the impeller magnet is further characterized as having a plurality of first magnetic regions magnetically polarized in a radially outward direction with respect to the shaft and a plurality of second magnetic regions magnetically polarized in a radially inward direction with respect to the shaft, wherein the number of first magnet regions is equal to the number of second magnet regions, and wherein each first magnet region is circularly disposed between two second magnet regions and each second magnet region is circularly disposed between two first magnet regions.

10. The improved impeller of claim 9 wherein the number of first magnetic regions is four and the number of second magnet regions is four.

* * * * *